(12) United States Patent
Diamond et al.

(10) Patent No.: US 6,490,544 B1
(45) Date of Patent: Dec. 3, 2002

(54) SYSTEM FOR TESTING A MULTI-TASKING COMPUTING DEVICE

(75) Inventors: Bryan M. Diamond, Meridian, ID (US); James D. Price, Meridian, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/498,203

(22) Filed: Feb. 4, 2000

(51) Int. Cl.$^7$ ............................................... G06F 11/00
(52) U.S. Cl. ...................................... 702/186; 711/114
(58) Field of Search ........................... 702/186; 711/114

(56) References Cited

U.S. PATENT DOCUMENTS

| | | | |
|---|---|---|---|
| 5,574,855 A | * 11/1996 | Rosich et al. ................ | 714/41 |
| 6,192,481 B1 | * 2/2001 | Deenadhayalan et al. ... | 711/114 |
| 6,336,088 B1 | * 1/2002 | Bauman et al. ............... | 703/14 |
| 2001/0020277 A1 | * 9/2001 | Deenadhayalan et al. ... | 713/323 |

OTHER PUBLICATIONS

Audet et al., "Implementing Fault Injection and Tolerance Mechanisms in Multiprocessor Systems", IEEE, 1996.*

Kaaniche et al., "A Hierarchical Approach for Dependability Analysis of a Commercial Cache–Based RAID Storage Architecture", IEEE, unknown date.*

* cited by examiner

*Primary Examiner*—Patrick Assouad
(74) *Attorney, Agent, or Firm*—Matthew L. Wade

(57) ABSTRACT

A test system for testing a multitasking computing device, such as a RAID storage device is described. The multitasking computing device is responsive to an inject fault command by entering a pre-determined mode of operation wherein the device maintains its present state and all command processing is terminated. As a result, the device becomes non-responsive to further commands. The test system includes a plurality of test programs. Each of the test programs being operable, when executed, to (a) test an associated function of the device and (b) transmit the inject fault command to the device if the test fails. In addition, each program is further operable, when executed, to (c) discontinue testing the device if the device becomes non-responsive. The test system further includes a processor and a multitasking operating system for executing the test programs concurrently.

5 Claims, 4 Drawing Sheets

SYSTEM FOR TESTING A MULTI-TASKING COMPUTING DEVICE

BACKGROUND OF THE INVENTION

Computing systems often include a mass storage system for storing data. One popular type of mass storage system is a "RAID" (redundant arrays of inexpensive disks) storage system. A detailed discussion of RAID systems is found in a book entitled, *The RAID-Book: A Source Book for RAID Technology*, published Jun. 9, 1993, by the RAID Advisory Board, Lino Lakes, Minn.

A typical RAID storage system includes a controller and a disk array coupled together via a communication link. The disk array includes multiple magnetic storage disks for storing data.

In operation, the controller of a RAID storage system operates to receive commands (e.g., I/O commands, configuration commands and status commands) from an external host computer. In response to an I/O command, for example, the controller reads and writes data to the disks in the disk array and coordinates the data transfer between the disk array and the host computer. Depending upon the RAID implementation level, the controller in a RAID system also generates and writes redundant data to the disk array. The redundant information enables regeneration of the user data in the event that one or more disks fail or are removed and the data becomes lost.

A RAID level 1 storage system, for example, includes one or more disks (data disks) for storing data and an equal number of additional "mirror" disks for storing the redundant data. The redundant data in this case is simply a copy of the data stored in the data disks. If data. stored in one or more of the data disks becomes lost, the mirror disks can then be used to reconstruct the lost data. Other RAID levels store redundant data for data distributed across multiple disks. If data on one disk becomes lost, the data in the other disks are used to reconstruct the lost data.

Typically, the developer of a RAID storage system will wish to thoroughly test the device before releasing the device for public use. Unfortunately, the testing of a RAID storage system can be very time consuming. In order to automate the testing, automated testing systems have been developed.

Typically a RAID storage device is a multitasking computing device. That is, a RAID storage device is able to process commands and perform a number of functions concurrently. A typical RAID test system is often used to test the ability of the RAID storage device to operate in a multitasking mode. For this reason, a RAID test system will execute multiple test programs concurrently during a test. Each test program or process generates test commands (e.g., I/O commands, configuration commands and status commands) and transmits these commands to the RAID storage device being tested. As the storage device responds to these commands, each test program operates to detect errors and will typically terminate when an error is detected. The test system will also typically include a recording device (such as a trace buffer, logic analyzer, etc.) in order to record the state of the RAID storage device when an error has occurred.

Such automated test systems can be very useful to the developer and can significantly reduce the amount of time spent testing the device as opposed to using manual techniques. One problem with such systems can be encountered, however, when one test process detects an error while other processes do not.

For example, the developer may wish to test the ability of the RAID storage device to perform function A concurrently with function B. For this purpose, the developer writes a first test program (program A) to cause the storage device to perform function A and a second test program (program B) to cause the storage device to perform function B. Each test program expects certain responses from the storage device during the test that indicate the associated function is being properly performed. If, during the test, the test program does not receive the expected response, the execution of the test program terminates.

During the test, each of the two test programs are executed concurrently so that function A and function B are performed by the RAID storage device concurrently. Assume, for example, program A detects that the RAID device failed to properly perform function A. As a result, program A terminates. Program B however, does not detect this condition as the RAID storage device continues to perform function B properly. Consequently, the state of the RAID device continues to change. Moreover, the information related to the state of the RAID device when the error (i.e., when function A failed) occurred can be lost as test data is overwritten. This can make reconciling test results difficult at best and sometimes impossible.

One solution to this problem is to is to develop a master process to coordinate the execution of the test processes. The master process communicates with the test processes using an interprocess communication path. If one test process experiences an error, the master process detects this condition and then operates to terminate the other test processes in order to maintain the state of the storage device under test. Unfortunately, this solution can add a significant amount of complexity to the test system and increase the amount of time to develop the test system itself.

Accordingly, what is needed is a simple way to synchronize test processes which are concurrently executed by a test system to test a multitasking computing device, such as a RAID storage device.

SUMMARY OF THE INVENTION

The present invention is directed to an apparatus for synchronizing test processes which are concurrently executed by a test system to test a multitasking computing device, such as a RAID storage device. Importantly, the apparatus is simple, easy to implement and can significantly reduce the complexity of the test system.

A test system having features of the invention is used for testing a multitasking computing device, such as a RAID storage device. The multitasking computing device is responsive to a predetermined command, which may be referred to herein as the "inject fault command", by entering a pre-determined mode of operation wherein the device maintains its present state and all command processing is terminated. As a result, the device becomes non-responsive to further commands.

The test system includes one or more memory devices for storing a plurality of test programs. Each of the test programs being operable, when executed, to (a) test an associated function of the device and (b) transmit the inject fault command to the device if the test fails. In addition, each program is further operable, when executed, to (c) discontinue testing the device if the device becomes non-responsive. The test system further includes a processor for executing the test programs concurrently.

During the execution of each of the test programs the test programs test the associated function of the device by transmitting test commands to the device and receiving responses from the device. In one preferred embodiment, the test system is configured to test a RAID storage device.

A RAID storage device embodying the invention includes an I/O port configured to receive commands from an external computer; a disk array having a plurality of data storage disks; and a controller. The controller includes a processor operable to process commands received at the I/O port. In addition, the controller operates to respond to a predetermined command received at the I/O port by placing the processor in a tight loop. While the processor operates in this mode, the RAID storage device maintains its present state and all operative processing is discontinued.

Other aspects and advantages of the invention will become apparent from the following detailed description, taken in conjunction with the accompanying drawings, illustrating by way of example the principles of the invention.

DESCRIPTION OF THE DRAWINGS

The following brief description of each drawing used in describing the present invention, and thus are being presented for illustrative purposes only and should not be limitative of the scope of the present invention, wherein.

DETAILED DESCRIPTION OF THE INVENTION

The invention will now be explained by means of non-limiting examples with reference to the accompanying drawings.

Figure 1:
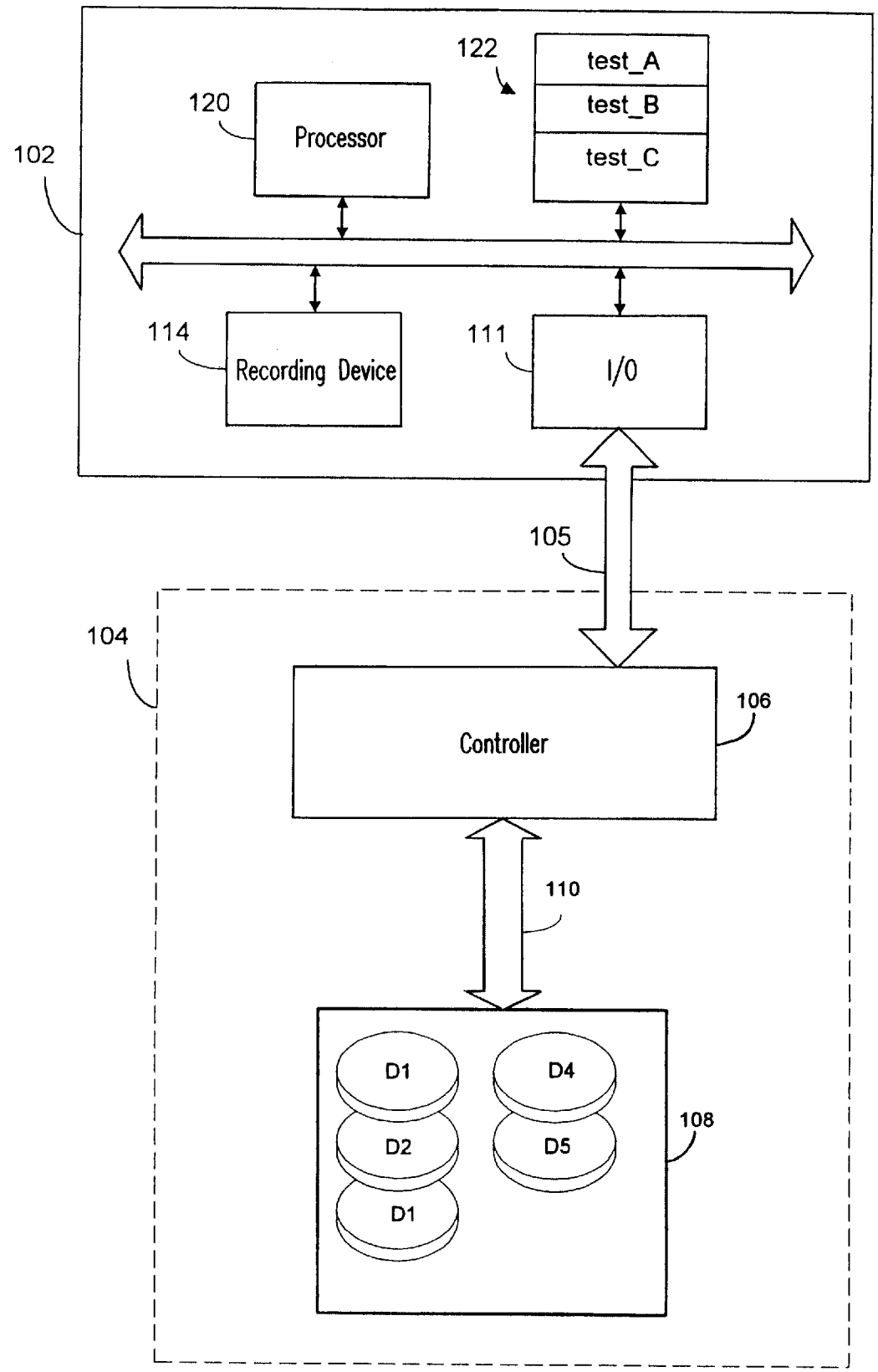
FIG. 1 shows a high level and simplified schematic of a test system and a RAID storage system each embodying features of the present invention.

FIG. 1 shows a high level and simplified schematic of a test system 102 and a RAID storage device 104. As will be described in detail below, the test system 102 is used to test various functional aspects of the RAID storage device 104.

It is first noted that the RAID storage device 104 may represent a storage system that stores data in accordance with any RAID level. Also, the RAID storage device 104 may store data according to multiple RAID levels. Thus, the RAID system 104 may represent a hierarchic RAID storage system.

As shown, the storage device 104 includes a controller 106 and a disk array 108. The controller 106 is connected to the test system 102 via a first communication link 105 and to the disk array 108 via a second communication link 110. Both of these links may represent any suitable communication path. For example, the first communication link 105 may represent, for example, a local area network (LAN). The second communication link 110 may represent, for example, a small computer system interface (SCSI). The disk array 108 includes a collection of disks (D1–D5) for storing data. Also, the disk array 108 includes components that are not shown but are well known in the art, such as read/write heads, drive motors, and data buffers. It is noted that in other implementations, the disk array may include more than five disks or less than five disks.

During a test operation, the controller 106 can receive test commands from the test system 102 via the communication link 105. In response to these test commands the controller 106 can read and write data to the disks D1–D5, perform configuration actions, return status information, etc.

Figure 2:
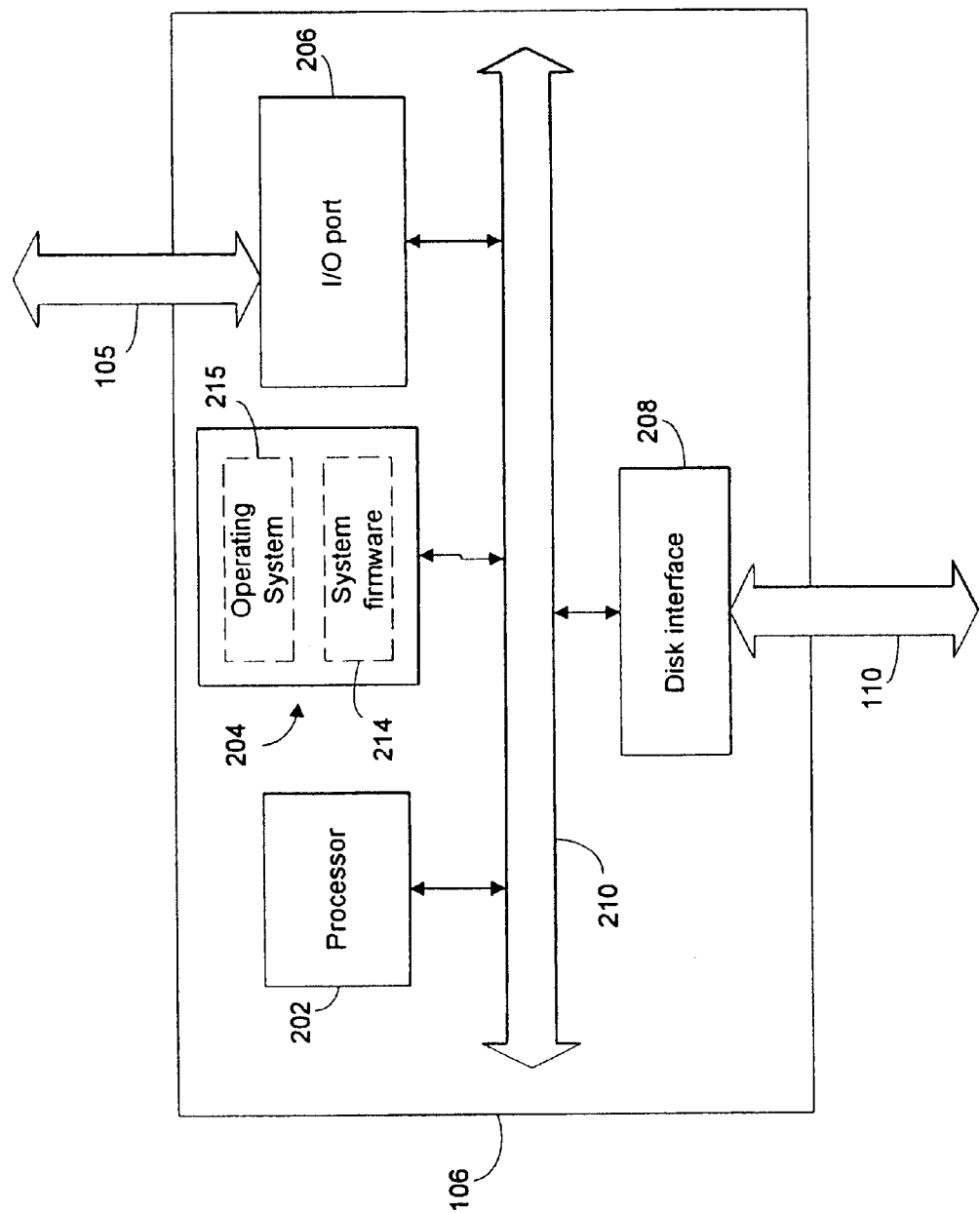
FIG. 2 shows a high level schematic of the controller of the RAID storage system;.

FIG. 2 shows a high level schematic of the controller 106. As shown, the controller 106 includes a processor 202, a memory 204, an I/O port 206 and a disk interface 208 all connected via a local bus 210. It is noted that each of these components may in fact include multiple devices. For example, the memory 204 may include one or more read only memories (ROM) and one or more random access memories (RAM). The local bus 210 may include, for example, one or more data buses with accompanying control buses. As shown, the I/O port 206 provides the controller 106 with an interface to the first communication link 105. The disk interface 208 provides an interface to the disk array 108 (via the second communication link 110).

Stored in the memory 204 are various system firmware programs 214 and an operating system 215. The operating system 215 is a multitasking operating system and enables the controller 106 to process multiple test commands and perform multiple functions concurrently.

Importantly and in accordance with the invention, the operating system 215 is adapted to interrupt I/O command processing when a predetermined command is received over the I/O port 206. This command may be referred to herein as the "inject fault command". Upon the inject fault command being received at the I/O port 206, the operating system 215 responds by placing the processor 202 into a "tight loop". That is, the processor 202 begins continuously executing an inoperative loop of firmware code without releasing resources to the other firmware programs. As a result, once the processor 202 enters this mode of operation all operative command processing terminates and the storage device 104 becomes non-responsive to further commands. In addition, while operating in this mode, the present state of the storage device 104 is maintained.

Referring again to FIG. 1, the components of the test system 102 are now further described. As shown, the test system 102 includes a processor 120, a memory 122, and an input/output (I/0) port 111 all connected via a local interface 112. The local interface 112 may include, for example, one or more data buses with accompanying control buses. The I/0 port 111 links the local interface to the to the communication link 105 and facilitates communications between the test system 102 and the RAID storage device 104.

In addition, the test system 102 may include a separate device (data recording device) 114 for recording test data produced by the RAID storage device 104 during a test. The recording device 114 may represent, for example, one or more logic analyzers, trace buffers, or disk drives.

It is assumed for purposes of this illustration that the developer of the RAID storage device 104 wishes to test the ability of the storage system to perform certain functions. For this purpose, the developer has written three test programs each of which are stored in memory 122 and are labeled as "test_A", "test_B" and "test_C". For example, test_A may test the ability of the storage device 104 to perform data transfer (function A), test_B may test the ability of the device to perform certain configuration actions (function B) and test_C may test the ability of the device to return certain status information (function C), such as disk status, log status, etc. Each of these test programs are executed concurrently during a test operation in order to test the ability of the storage device 104 to perform these functions concurrently.

Figure 3:
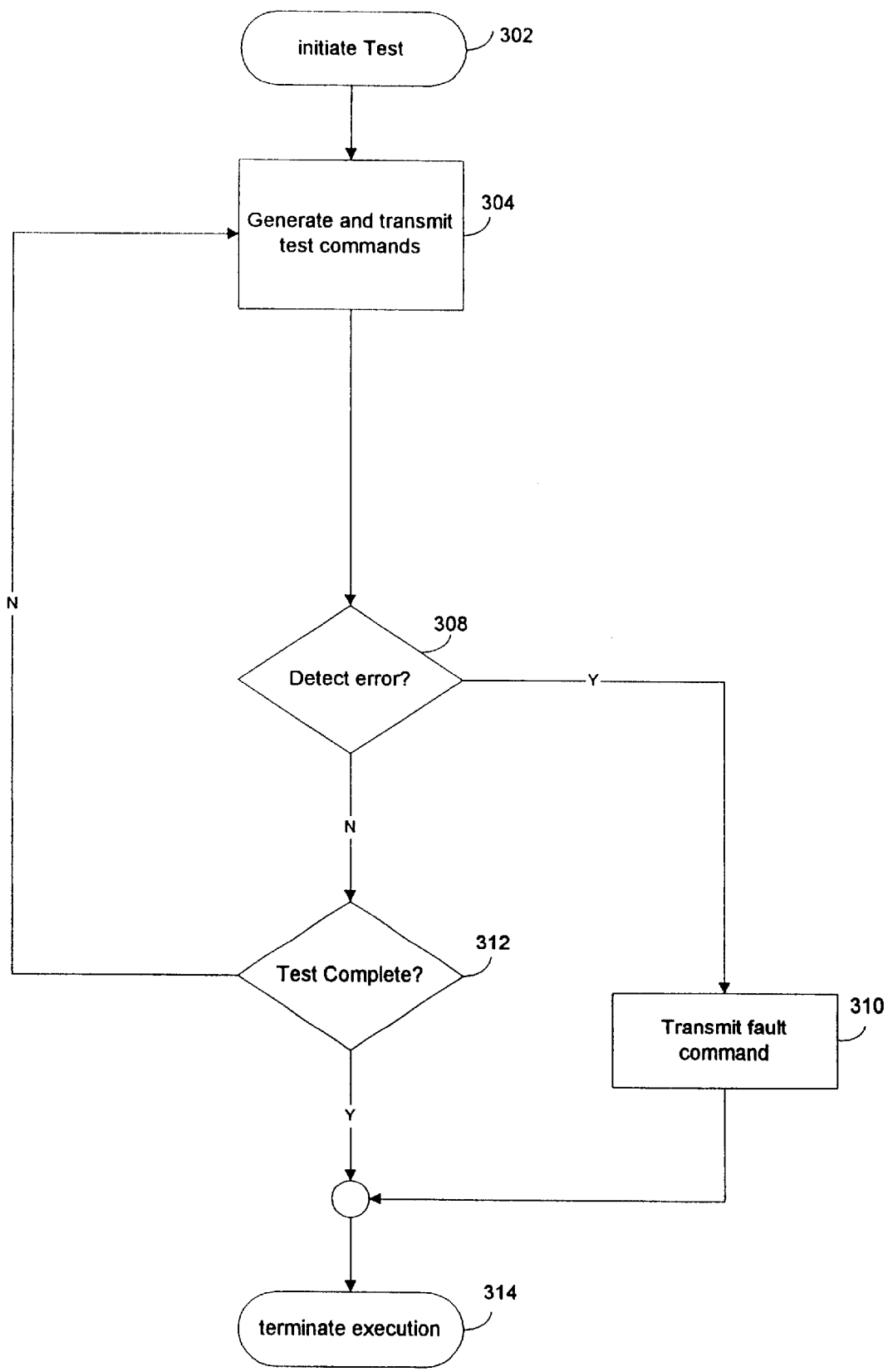
FIG. 3 provides the general logic followed by each of the test programs as each of these programs are concurrently executed by the test system.

FIG. 3 provides the general logic followed by each of the test programs as each of these programs are concurrently executed by the test. system 102. As shown in FIG. 3, a test program upon being initiated (step 302), operates to generate and to transmit test commands to the RAID storage device 104 (step 304) in order to test the ability of the device to perform the corresponding function. Thus, for example, test_A transmits commands to test the ability of the device to properly perform function A.

As the test commands are transmitted, the test program expects to receive certain responses from the RAID storage device 104. If the expected response is received the test program determines that the RAID storage device 104 is successfully performing the corresponding function (decision step 308) and the test continues until either an error is detected or the test is completed (decision step 312). When the test is completed, the execution of the test program terminates (step 314).

If, however, the test program does not receive the expected response during the test, or the storage device 104 is non-responsive, the program determines an error has occurred (decision step 308) and the test program responds by transmitting the inject fault command to the Raid storage device 104 (step 310). The execution of the test program then terminates (step 314).

As indicated above, upon receiving the inject fault command, the storage device 104 halts all I/O command processing and becomes non-responsive to further commands. Importantly, because the storage device 104 is now non-responsive, the other test programs being executed subsequently determine an error has occurred. As a result, the execution of the other programs terminates. Thus, in this manner, the test programs have been synchronized.

From the foregoing it will be apparent that the invention provides a novel and advantageous technique for synchronizing the execution of test processes which are concurrently executed to test a RAID storage device. This is accomplished without the need for a master process to coordinate the execution of the test processes. As discussed above, the development of such a master process can add a significant amount of complexity to a test system and increase the amount of time to develop the test system itself. In contrast, the present invention provides a test system that is simple and easy to implement.

In addition, because the state of the storage device 104 remains unaltered after receiving the inject fault command, this can greatly simplify reconciling test results. For example, during the test the trace buffer may be recording the commands that were sent to the storage system. Because all the processes are terminated soon after one of the test programs detects an error, the data in the buffer is not overwritten with commands transmitted after the error occurred.

As just shown, the present invention can be used to improve the testing of a RAID storage system. It should also be understood that the present invention can also be used to improve the testing of other types of multitasking computing devices.

Figure 4:
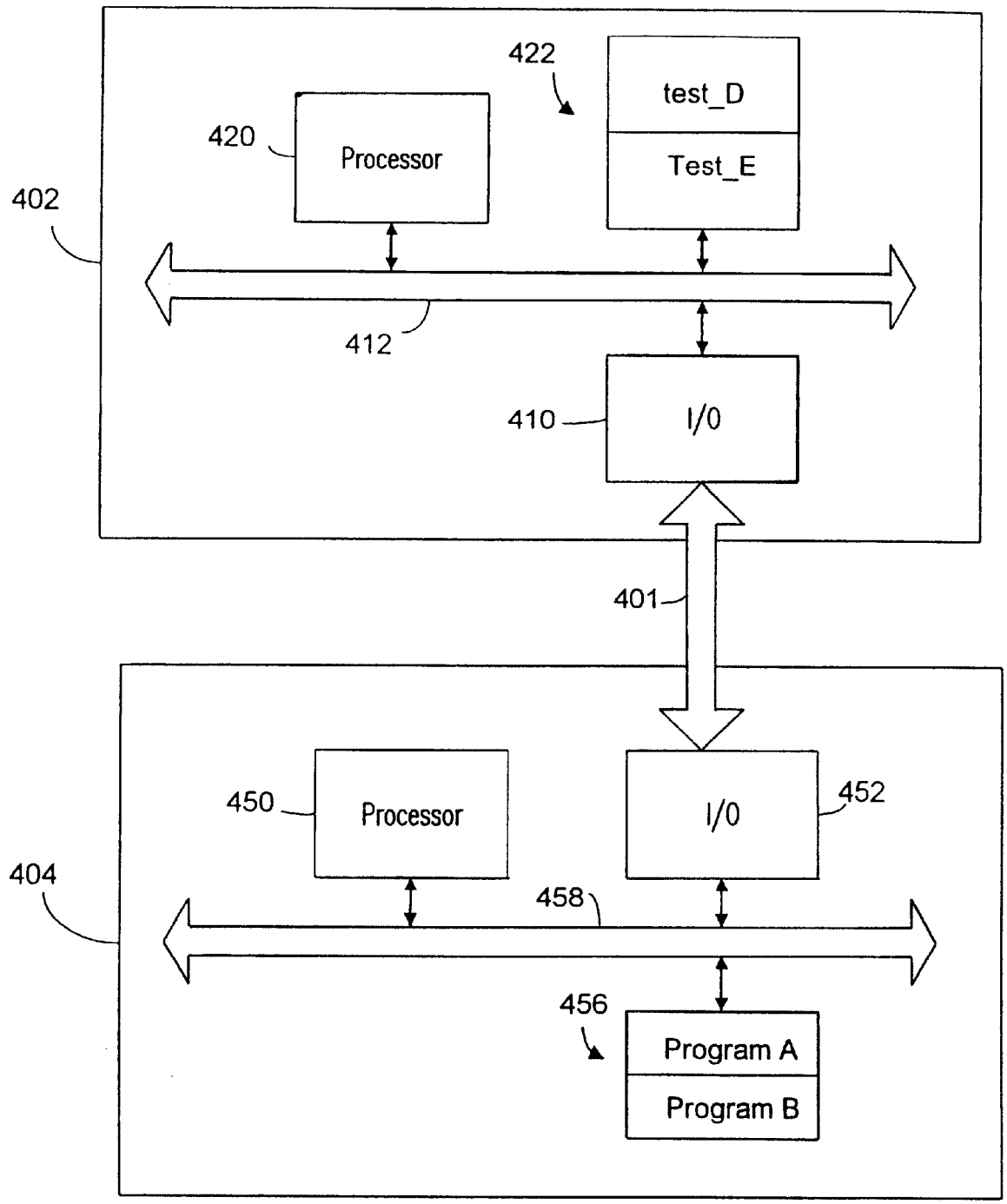
FIG. 4 shows a high level and simplified schematic of a test system and a computing device each embodying additional features of the present invention.

For example, consider a second embodiment of the invention which is depicted in FIG. 4. FIG. 4 shows a high level and simplified schematic of a test system 402 which is used to test a computing device 404.

It is first noted that the computing device 404 may represent any number of device types which are able to process input commands concurrently. Thus, for example, the computing device 404 may represent a number of general purpose computing devices, such as a personal computer or a workstation. Alternatively, the computing device 404 may represent any number of special purpose computing devices, such as an image forming device (e.g., a laser printer, scanner, facsimile machine, etc.) or a network device (e.g, a router, hub, gateway, etc,).

As shown, the test system 402 includes a processor 420, a memory 422 and an I/O port 410 all connected via a local interface 412. The computing device 404 includes a processor 450, an I/O port 452 and a memory 456 all connected via a local interface 458. The test system 402 is connected to the computing device 404 via communication link 401.

It is assumed in this second embodiment, that two new programs stored in the memory 456 have been added or changed and the developer now wants to test their functionality. These two programs are labeled as "program_A" and "program_B". Importantly, the computing device 404 further includes a multitasking operating system that is able to execute program_A and program_B concurrently.

In addition, the multitasking operating system is responsive to an inject fault command received at the I/O port 452 by placing the processor 450 into a tight loop. Once the processor 450 enters this mode of operation the processor 450 begins continuously executing an inoperative loop of code without releasing resources to other software of firmware programs. As a result, once the processor 450 enters this mode of operation the processing of all other software or firmware programs halts and the computing device 404 is non-responsive to further commands. In addition, the present state of the computing device 404 is maintained.

It is further assumed in this second embodiment that the developer has written two test scripts which are labeled as "test_D" and "test_E". During a test, test_D and test_E are both executed concurrently and are used to test 10 certain aspects of program A and program B. Importantly, during a test operation each of the test programs are adapted to test for errors and if an error is detected to then transmit an inject fault command to the computing device 404. This causes the computer device 404 to halt all operative processing and to become non-responsive. As a result, the other test program detects an error and terminates. Thus, in this manner, synchronization of test_D and test_E is achieved.

It is noted that in the embodiments described above, the functionality provided by the test programs may also be provided, in whole or in part, by hardware components. For example, one or more of the steps illustrated in FIG. 3 could be performed (the following is a non-exhaustive list) by operation of an application specific integrated circuit (ASIC), a programmable gate array (PGA) or a field programmable gate array (FPGA) or by some combination thereof.

In addition, the present invention may also be embodied as a computer useable medium having computer readable program code embodied therein for causing a computer to perform one or more of the steps depicted in FIG. 3 or to respond to the inject fault command in the manner described above. In the context of this document, "computer useable medium" can be any means that contain, store, propagate or otherwise transport the program for use by or in connection with an instruction execution system, apparatus or device. The computer useable medium can be, for example (the following is a non-exhausting list), a magnetic, optical or a semiconductor based storage device (e.g., the memory 122 depicted in FIG. 1).

While various embodiments of the present invention have been described above, it should be understood that they have been presented by way of example only, and are not intended to be limiting. Thus, the breadth and scope of the present invention should not be limited by any of the above described exemplary embodiments, but should be defined only in accordance with the following claims and their equivalents.

What is claimed is:

1. A RAID storage device, comprising:
   (a) an I/O port configured to receive commands from an external computer;
   (b) a disk array having a plurality of data storage disks;
   (c) a processor, coupled to the I/O port and to the disk array, operable to process commands received at the I/O port; and
   (d) means for maintaining the present state of the storage device in response to the I/O port receiving a first pre-determined command.

2. The storage device of claim 1, wherein the maintaining means operates to place the processor in a tight loop upon receiving the first pre-determined command.

3. The storage device of claim 1, wherein the maintaining means operates to cause the processor to continuously execute a set of inoperative program instructions.

4. The storage device of claim 1, wherein the maintaining means operates to cause the processor to be non-responsive to further commands received at the I/O port after the first pre-determined command is received.

5. The storage device of claim 4, wherein the maintaining means includes a multitasking operating system.

* * * * *